US010060833B2

(12) United States Patent
Hashmi et al.

(10) Patent No.: US 10,060,833 B2
(45) Date of Patent: Aug. 28, 2018

(54) APPARATUS FOR TESTING SHAPE MEMORY EFFECTS IN LIQUID BATH

(71) Applicant: Council of Scientific & Industrial Research, New Delhi (IN)

(72) Inventors: Syed Azhar Rasheed Hashmi, Bhopal (IN); Hari Narayan Bhargaw, Bhopal (IN); Ajay Naik, Bhopal (IN); Jagdish Prasad Pandey, Bhopal (IN); Mulayam Singh Yadav, Bhopal (IN); Navin Chand, Bhopal (IN)

(73) Assignee: Council of Scientific & Industrial Research, New Delhi (IN)

( * ) Notice: Subject to any disclaimer, the term of this patent is extended or adjusted under 35 U.S.C. 154(b) by 150 days.

(21) Appl. No.: 15/156,994

(22) Filed: May 17, 2016

(65) Prior Publication Data
US 2016/0349036 A1    Dec. 1, 2016

(30) Foreign Application Priority Data

May 26, 2015    (IN) .......................... 1496/DEL/2015

(51) Int. Cl.
*G01B 7/24* (2006.01)
*G01B 7/04* (2006.01)
*G01M 99/00* (2011.01)

(52) U.S. Cl.
CPC ................................. *G01M 99/002* (2013.01)

(58) Field of Classification Search
CPC .................................................. G01M 99/002
USPC ......................................................... 73/37.5
See application file for complete search history.

(56) References Cited

U.S. PATENT DOCUMENTS

| 4,869,112 | A * | 9/1989 | Gram ....................... G01N 3/08 73/796 |
| 6,148,676 | A | 11/2000 | Bergs |
| 7,191,664 | B2 | 3/2007 | Thom et al. |
| 7,240,545 | B1 | 7/2007 | Jennings |
| 8,065,929 | B2 * | 11/2011 | Yakimoski ............... G01N 3/08 73/865.6 |
| 8,443,661 | B1 * | 5/2013 | Bi .......................... G01N 33/24 73/152.05 |

(Continued)

OTHER PUBLICATIONS

Rousseau, Ingrid A., "Challenges of Shape Memory Polymers: A Review of the Progress Toward Overcoming SMP's Limitations", *Polymer Engineering & Science*, Nov. 2008, pp. 2075-2089, vol. 48, Issue 11, John Wiley & Sons, Inc., US.

*Primary Examiner* — Natalie Huls
*Assistant Examiner* — Monica S Young
(74) *Attorney, Agent, or Firm* — Alston & Bird LLP (57) ABSTRACT

A shape memory effect measuring apparatus is provided that is useful for tensile stress, strain and recovery stress measurement. The apparatus includes a load cell, a linear variable displacement transducer, a temperature sensor, a rigid platform, a computer-based data recorder and a processing system a load frame, grips to hold sample, and a liquid bath. The liquid bath is mounted on the rigid stand platform to hold the liquid bath. A uniform temperature of liquid is attained by controlled heating and stirring arrangement. The computer-based processing system may be used to monitor and control the desired temperature of the sample. A change in length of a specimen and stress generated during expansion thereof may be recorded, from which strain and stress may be calculated using the apparatus.

14 Claims, 1 Drawing Sheet

(56) References Cited

U.S. PATENT DOCUMENTS

| | | | | |
|---|---|---|---|---|
| 8,495,919 B1* | 7/2013 | Geese | ............... | G01N 25/12 |
| | | | | 374/52 |
| 2014/0141224 A1* | 5/2014 | Pasquali | ............ | C01B 31/00 |
| | | | | 428/219 |
| 2014/0345358 A1* | 11/2014 | White | .............. | G01N 3/08 |
| | | | | 73/1.37 |

* cited by examiner

APPARATUS FOR TESTING SHAPE MEMORY EFFECTS IN LIQUID BATH

CROSS-REFERENCE TO RELATED APPLICATIONS

This application claims priority to and the benefit of Indian Patent Application No. 1496/DEL/2015, filed May 26, 2015, the contents of which as are hereby incorporated by reference in their entirety.

BACKGROUND

Field of Invention

This invention relates to a novel apparatus for testing shape memory effects in liquid bath. The present invention provides a means of measuring shape memory effects under harsh environments including hot, cold, corrosive, non-corrosive, chemically reactive, acidic, basic, neutral liquid mediums. It is capable of measuring mechanical properties including recovery force of the shape memory polymers and composites in an efficient but inexpensive and simple arrangement under controlled temperature and in different liquids/environment conditions.

Related Art

Shape Memory Materials are a broad class of smart materials which are capable of holding a temporary shape until a suitable stimulus is applied after which they regain their original permanent shape. Several materials exhibit the Shape Memory Effect (SME), such as Shape Memory Alloys (SMA), Shape Memory Polymers (SMP), Shape Memory Ceramics and Shape Memory Gels. SME is reported in terms of strain recovery rate, stress recovery rate, shape fixity, etc as reference could be made to a publication "Challenges of shape memory polymers: A review of the progress toward overcoming SMP's limitations, published in Polymer Engineering & Science, Volume 48, Issue 11, pages 2075-2089, November 2008 by John Wiley & Sons, Inc. This document contains state of art reviews and experimental studies related to shape memory polymers. A thermo-mechanical programmed cycle describes well the effect of temperature on stress and strain developed within the specimen. Normally thermo-mechanical cycles for Shape Memory Polymer are studied in an environmental chamber having air or nitrogen circulation. Heat is provided generally by electrical heaters and cooling is done either through forced circulation of air or by using liquid nitrogen circulation arrangement. The thermo-mechanical programmed cycle used for evaluation of shape memory effects of materials consists of following steps; in the first step the sample is fixed at a standard gauge length which is named as original length ($l_o$) and the environmental chamber is brought to a high temperature $T_h$ which is chosen above the glass transition temperature, $T_g$, of polymer. The sample is stretched at predetermined strain and the corresponding force is measured by the load cell and thereby calculating the stress on the sample. The second step involves the cooling of the sample while maintaining the strain, to room temperature by either of natural cooling or by forced cooling using liquid nitrogen or any other suitable method by simply cooling the supplied air. Once the sample is cooled, it is unclamped. The length of relaxed sample is measured and termed as deformed length ($l_d$). In third step the sample is clamped and temperature of environmental chamber is brought to $T_h$. The recovery stress generated in the sample due to its shape memory effect is measured. The strain on the sample is decreased and corresponding stresses are measured. Finally the recovered length is measured at almost zero value of recovery stress.

Presently tensile testing of materials is one of the most common ways to measure material dependent properties. Such tests can give almost any material data a designer needs to know.

For tensile testing the specimen is normally mounted between two attachments. One of the attachments is normally arranged at a frame, while the other is arranged at a movable pulling yoke. The pulling yoke is moved so as to elongate the tensile testing specimen, which finally breaks. The relation between strain and tensile force may be recorded as the pulling continues. The standard apparatus are used all over the world for measuring mechanical properties of different materials such as metals, ceramics, polymers, composites, and others. However, for the measurement of specific properties of materials, different arrangements, fixtures, test jigs etc. are used for customize testing.

U.S. Pat. No. 6,148,676 of Tensile testing machine can be referred as an apparatus developed for metallic materials, which measures the strain for a tensile testing specimen by means of the relative displacement, which is independent of the applied tensile testing force. U.S. Pat. No. 8,065,929 can be referred as visual mechanical test apparatus that includes a pressure generation source and an isolation cylinder which is used to measure the mechanical properties of materials under high pressure conditions. The test apparatus further includes a pressure containment cell configured to receive a test specimen, an environmental chamber disposed about the pressure containment cell, and a load frame operably associated with the pressure containment cell. The pressure containment cell is in fluid communication with the pressure generation source and the isolation cylinder and includes a viewing window. U.S. Pat. No. 7,191,664 can be referred as apparatus for testing of mechanical properties of materials for use in pavement construction. The sample container has a first open face via which a compressive load can be applied to the sample and a second face disposed orthogonally to the first open face. At least a portion of the second face is resiliently displaceable. U.S. Pat. No. 7,240,545 can be referred for measurement of expansion and contraction of sample curing under pressure and temperature.

Normally shape memory effects such as recovery stress, shape fixity, percentage recovery, etc. are measured above glass transition temperature of the material for which environment chamber having inert environment or specific environment is used. For the second programmed steps, the temperature of the chamber including grips and specimen is to be brought to below glass transition temperature to enable the sample to reach a temporary shape. The attainment of the lower temperature by the specimen as well as by the grips is a time consuming phenomena. For the third programmed steps of the thermo mechanical shape memory creation process, the temperature of the environment chamber is increased to a temperature higher than the glass transition temperature as attained in the first step. After measuring the stress and corresponding strain in the sample the temperature is again brought to below the glass transition temperature. In this process the temperature conditions are very important to characterize the shape memory effects. The problem associated with the present practice in the measurement of shape memory effects is its inevitable time consuming process. Most of the time goes in cooling and heating the environmental chamber and its accessories including sample grips and the test specimen. Delayed cooling and prolonged heating in environment chamber of a tensile testing machine may cause deterioration and degradation of the material to be tested. Moreover, the tensile testing machine having environment chamber are not capable of testing the material under liquid environment of harsh fluid environment

BRIEF SUMMARY

The present invention of a test apparatus for testing shape memory effects in liquid bath mainly overcomes above described problems. Accordingly, this invention comprises a shape memory effect measuring apparatus useful for tensile stress, strain and recovery stress measurement having a load cell, LVDT (Linear variable displacement transducer), temperature sensor, temperature controller, rigid platform, a PC based data recorder with processing system developed for load cell, load frame, grips to hold sample and a liquid bath. The instrument has the provision of sample testing in the controlled uniform temperature under defined liquid environment. The liquid bath is mounted on the rigid stand platform to hold the liquid bath. Sample and holding grips are submerged in the liquid. A uniform temperature of liquid is attained by controlled heating and stirring arrangement. A PC based controller is used to monitor and control the desired temperature of the sample. The holding device is used to fasten a specimen by the suitable grips. The change in length in the specimen and stress generated during the shrinkage or expansion is record by the PC based data acquisition system and subsequently data processing is carried out to calculate the strain and stress.

A stress and strain measurement instruments under control situation is to measure applied stress during elongation of specimen and corresponding strain is calculated by the change in the length of the specimen. The change in the length is measured by the LVDT and corresponding generated stress is measured by the load cell. The change in length and generated stress data is recorded by the PC based data acquisition system. The complete system is mounted on the rigid body frame arrangement. The test sample is mounted between the first and second grips. The first grip is arranged on at a movable cross head of the load frame and second grip is stationary and firmly attached at the base-plate of the frame. The movable cross head is attached with the stepper motor of constant torque for uniform motion. It may also have a provision to provide motion by hand wheel rotations.

The test sample is submerged in a liquid and elongated under constant/gradient/sweep temperature of the liquid by the applied tensile force. The quantities to be measured are the strain of testing specimen and the tensile force of the movable cross head.

DETAILED DESCRIPTION OF VARIOUS EMBODIMENTS

Figure 1:
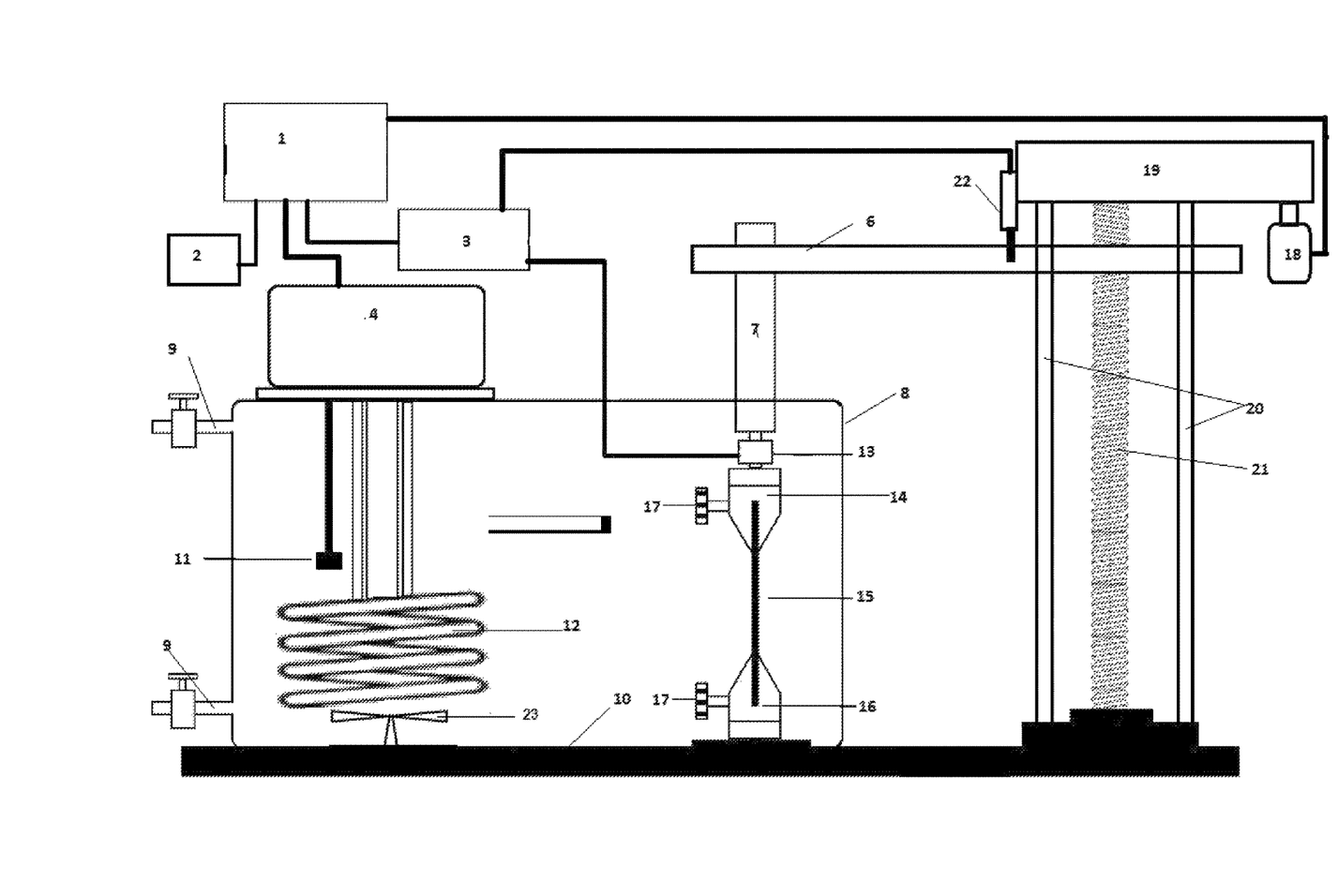
FIG. 1 shows complete apparatus for testing shape memory effects in liquid bath which comprises the following:
1. Computer with data acquisition system
2. DC power supply
3. Signal Processor
4. Electric heater temperature controller
5. Hand wheel (not shown, optional)
6. Cross head
7. Device mounting plate
8. Open Liquid Bath
9. Water inlet and outlet
10. Base plate of structure
11. Temperature sensor
12. Heating coil
13. Load cell
14. Movable Grip
15. Specimen
16. Stationary Grip
17. Gripping screw
18. Constant torque Servo motor
19. Gear box
20. Supporting Pillars
21. Constant pitch screw
22. Linear Variable Differential Transformer (LVDT)
23. Stirring arrangement

The details of the apparatus can be understood by schematic illustration given in FIG. 1.

Specifically, the apparatus comprises a rigid load fame structure including supporting pillars 20 as shown in FIG. 1, constant pitch screw 21 and base plate of structure 10. Assembly of crosshead 6 and device mounting plate 7 is moving linear on the screw 21 through the guide pillars 20. Screw 21 is attached to servo motor 18 through the gear transmission ratio 19. The generated torque form 18 is transferred to screw 21 by suitable gear ratio 19 for linear movement of assembly 6 & 7. The measurement device load cell 13 is attached to device mounting plate 7 of the assembly and first grip 14. The specimen 15 is firmly mounted in the grips 14 & 16 with the gripping screws 17. The second grip 16 is rigidly attached with the base plate 10 of the load frame. The heating system consists of heating controller 4, heating coil 12 with starrier and temperature sensor 11. The components 11, 12, 14, 15, 16 are submerge in the liquid medium. The liquid medium is kept in open liquid bath 8 which is firmly attached with base plate 10. The open liquid bath 8 has a provision for liquid circulation through inlet and outlet openings 9. The measured data from load cell 13 and LVDT 22 are recorded in the computer with data acquisition system 1 through signal processor 3. The heater controller 4 and servo motor 18 is also controlled by the computer 1. The power supply 2 is used to provide the necessary power requirements of the apparatus and devices attached in it.

Exemplary Specifications of Apparatus
Max Travel length: 290 mm
Max Load Capacity: 1.5 kN
Temperature of Liquid bath: Ambient to 100° C. (for transparent polymeric material bath)
: Ambient to 200° C. (for Stainless steel bath with glass window)
Speed range of travel: 15 to 300 mm/min
Power supple: 230V 50 Hz AC
Exemplary Objects of the Invention
1. The main object of the present invention is to provide a novel measurement apparatus for testing shape memory effects of smart shape memory materials.
2. Another object of the present invention is to provide measurement of shape memory effects such as shape recovery, shape fixity, shape recovery stress, shape recovery strain, through measurable parameters such as displacement, load, strain rate, time and temperature.
3. Another object of the present invention is to provide apparatus for measurement of shape memory effect of shape memory polymers, smart materials, composites, thermo sensitive shape recovery materials using thermomechanical cycles.

4. Another object of the present invention is to provide liquid bath or chamber with controlled heating and stirring arrangement for the desired medium.
5. Another object of the present invention is to provide a liquid circulation system to maintain the desired temperature and environment of the bath.
6. Another object of the present invention is to provide a means of measuring shape memory effects under harsh environments including hot, cold, corrosive, non-corrosive, chemically reactive, acidic, basic, neutral liquid mediums.
7. Another object of the present invention is to provide load frame structure having fixed as well as moving port.
8. Still another object of the present invention is to provide a faster heating as well as cooling to the sample grips by using high heat capacity liquid for reducing testing time.
9. Still another object of the present invention is to provide a measurement on different size and shape of sample such as films, rods, filaments, bars and other standard shapes.
10. Still another object of the present invention is to provide a visual measurement under transparent liquid.
11. Still another object of the present invention is to develop small table top apparatus for measurement of shape memory effects.
12. Still another object of the present invention is to provide the desired level of strain either by manual or automatic controlled.
13. Still another object of the present invention is to provide the provision of attachment of different types of grips for different shapes of test specimen.
14. Still another object of the present invention is to provide measurement of displacement by the LVDT device.
15. Still another object of the present invention is to provide stress measurement by the standard calibrated load cell.
16. Still another object of the present invention is to provide the PC based data recording and analysis system.

Accordingly, the present invention provides an apparatus for testing shape memory effects comprising; computer with data acquisition system (1) connected to DC power supply (2), signal processor (3), load frame structure which consists of base plate structure (10), supporting pillar (20) vertically above the base plate structure (10), constant pitch screw (21) inside the supporting pillar (20), crosshead (6) is connected to the screw (21) and mounting pate (7) mounted on crosshead (6) is moving linear on the screw (21) through supporting pillar (20), screw (21) is attached to servo motor (18) or hand wheel (5) (not shown in the FIGURE) (optional) through the gear box (19), measurement device load cell (13) attached to mounting plate (7) at one end and movable grip (14) at the other end, load cell (13) is also connected to signal processor (3), Linear variable displacement transducer (LVDT) (22) is used for displacement measurement mounted on crosshead (6) and measurements are recorded in the computer (1) through signal processor (3), a specimen (15) is held between movable grip (14) and stationary grip (16) with the gripping screws (17), the heating system consists of heating controller (4) which is connected to the computer (1), heating coil (12) and temperature sensor (11) connected to heating controller (4), water bath (8) kept at the base plate (10) that consists of inlet and outlet (9), stirring arrangement (23) for stirring of the liquid.

In an exemplary embodiment of the present invention, the temperature sensor (11), heating coil (12), movable grip (14), specimen (15), stationary grip (16), gripping screws (17) and stirring arrangement (23) are kept submerged in liquid medium.

In still yet another exemplary embodiment of the present invention, measurement is carried out of shape memory effect of samples of polyurethane and composite samples nanotubes (MWCNT) reinforced shape-memory-thermoplastic-polyurethane (SMTPU) using thermo-mechanical cycles.

In still yet another exemplary embodiment of the present invention, the liquid bath may be open or closed chamber with controlled heating and stirring arrangement for the desired liquids and the liquid bath/chamber is of transparent and non-reactive material like water.

In still yet another exemplary embodiment of the present invention, the liquid bath has additional provision of liquid circulation system to maintain the desired temperature range of 30 to 70° C.

In still yet another exemplary embodiment of the present invention, the liquid medium includes harsh environments such as hot, cold, corrosive, non-corrosive, chemically reactive, acidic, basic, neutral, liquid mediums.

In still yet another exemplary embodiment of the present invention, the apparatus provides measurement of shape memory effects such as shape recovery, shape fixity, shape recovery stress, shape recovery strain, through measurable parameters such as wheel revaluation ranging from 0 to 25.2, sample length ranging from 5 to 30.2 mm, stress ranging from 0 to 4.38 MPa, % strain ranging from 70 to 251, recovery stress ranging from 0 to 4.04 MPa, temperature maintained at 70±1° C.

In still yet another exemplary embodiment of the present invention, the apparatus provides measurement on different size and shape of sample such as films, rods, filaments, bars and other standard shapes.

In still yet another exemplary embodiment of the present invention, the apparatus provides visual measurement under transparent liquid.

The novelty and inventive steps of the novel apparatus for measuring shape memory effects resides in the design of apparatus that provides liquid bath to create a desired environment of thermo-mechanical testing in short duration.

Following examples are given by way of illustration and therefore should not be constructed to limit the scope of present inventions.

EXAMPLES

For experimental testing of the apparatus, samples of polyurethane and composite samples nanotubes (MWCNT) reinforced shape-memory-thermoplastic-polyurethane (SMTPU) were tested.

Experiment-1

The sample/specimen-1 of SMTPU of dimension (mm) 5×10×0.1 mm was mounted in grips. Water was filled in the liquid bath to a level so that test specimen is completely immersed in water. Using temperature controller and heater, the temperature was increased to 70° C. with constant stirring to maintain uniformity in the liquid path. Test was conducted at fixed 70° C. temperature of the liquid. The sample was stretched at a constant rate and the corresponding stress in MPa is recorded through PC based data acquisition systems. The observation by the instrument is shown in Table-1 and evaluated by the instrument software. During stretching of sample at constant rate, the stress generated in the sample was obtained using the calibrated load cell. These values of load while divided by cross section of test specimen were considered as stress in MPa which is shown in Table-1.

TABLE 1

| Sl. No. | Wheel Rotation (rpm) | Sample length (mm) | Stress (MPa) |
|---|---|---|---|
| 1 | 0 | 5 | 0 |
| 2 | 2.1 | 7.1 | 0.505668605 |
| 3 | 4.2 | 9.2 | 0.794463953 |
| 4 | 6.3 | 11.3 | 1.011060465 |
| 5 | 8.4 | 13.4 | 1.227656977 |
| 6 | 10.5 | 15.5 | 1.516452326 |
| 7 | 12.6 | 17.6 | 1.733048837 |
| 8 | 14.7 | 19.7 | 1.949645349 |
| 9 | 16.8 | 21.8 | 2.094043023 |
| 10 | 18.9 | 23.9 | 2.310639535 |
| 11 | 21 | 26 | 2.455037209 |
| 12 | 23.1 | 28.1 | 2.671633721 |
| 13 | 25.2 | 30.2 | 2.816031395 |

Results: System is working well. Temperature of liquid bath at 70° C. was attained with variation of ±1° C. System is capable of reporting correct stress and strain by the calibrated load cell and LVDT, which are mounted in the instrument.

Example-2

Experiment

At fixed temperature 70° C. recovery a stress measurement of stretched sample/specimen-1: Constrained recovery system was measured using this instrument. An a stretched sample was fixed in the grip and liquid bath was filled with water at 70° C. and therefore was maintained at 70° C. The SMP film sample exerted a stress at 70° C. The load was sense through load self and then by dividing cross sectional area of test sample the recovery system was calculated as shown in Table-2.

TABLE 2

| Sl. No | % Strain | Recovery Stress (MPa) |
|---|---|---|
| 1 | 248 | 2.599434884 |
| 2 | 227 | 1.588651163 |
| 3 | 206 | 1.227656977 |
| 4 | 185 | 0.866662791 |
| 5 | 164 | 0.650066279 |
| 6 | 143 | 0.505668605 |
| 7 | 122 | 0.36127093 |
| 8 | 101 | 0.216873256 |
| 9 | 75 | 0 |

Results: The Table-2 shows 9 different typical recovery stress values obtained correspondingly to different % of strain. The recovery stress values are important for evaluating shape memory properties of material.

Example-3

Experiment

At fixed strain 248% and temperature varying and corresponding a stress measurement of stretched sample/specimen 1. SMTPU sheet having induced strain was studied to observe the change in stresses will temperature from 30° C. to 70° C. The raise in temperature was controlled by temperature controller. The observations were recorded through the PC based data acquisition at an interval of 5° C. and corresponding stresses in terms of load were measured is shown in Table-3.

TABLE 3

| Sl. No | Temperature in (° C.) | Recovery Stress (MPa) |
|---|---|---|
| 1 | 30 | 0 |
| 2 | 35 | 0 |
| 3 | 40 | 0.866662791 |
| 4 | 45 | 1.227656977 |
| 5 | 50 | 1.588651163 |
| 6 | 55 | 1.805247674 |
| 7 | 60 | 1.949645349 |
| 8 | 65 | 2.310639535 |
| 9 | 70 | 2.599434884 |

Results: Result of change in recovery strains with temperature under constrained conditions is shown in Table-3 using this instrument.

Example-4

Experiment

The sample/specimen-2 of 1 phr MWCNT of dimension (mm) 5×10×0.1 mm was mounted in grips. Water was filled in the liquid bath to a level so that test specimen is completely immersed in water. Using temperature controller and heater, the temperature was increased to 70° C. with constant stirring to maintain uniformity in the liquid path. Test was conducted at fixed 70° C. temperature of the liquid. The sample was stretched at a constant rate and the corresponding stress in MPa is recorded through PC based data acquisition systems. The observation by the instrument is shown in Table-4 and evaluated by the instrument software. During stretching of sample at constant rate, the stress generated in the sample was obtained using the calibrated load cell. These values of load while divided by cross section of test specimen were considered as stress in MPa which is shown in Table-4.

TABLE 4

| Sl. No. | Wheel Rotation (rpm) | Sample length (mm) | Stress (MPa) |
|---|---|---|---|
| 1 | 0 | 5 | 0 |
| 2 | 2.1 | 7.1 | 0.54359375 |
| 3 | 4.2 | 9.2 | 0.85404875 |
| 4 | 6.3 | 11.3 | 1.16450375 |
| 5 | 8.4 | 13.4 | 1.47495875 |
| 6 | 10.5 | 15.5 | 1.78541375 |
| 7 | 12.6 | 17.6 | 2.09586875 |
| 8 | 14.7 | 19.7 | 2.32871 |
| 9 | 16.8 | 21.8 | 2.639165 |
| 10 | 18.9 | 23.9 | 2.87200625 |
| 11 | 21 | 26 | 3.1048475 |
| 12 | 23.1 | 28.1 | 3.260075 |
| 13 | 25.2 | 30.2 | 3.49291625 |

Results: System is working well. Temperature of liquid bath at 70° C. was attained with variation of ±1° C. System is capable of reporting correct stress and strain by the calibrated load cell and LVDT, which are mounted in the instrument.

Example-5

Experiment

At fixed temperature 70° C. recovery a stress measurement of stretched sample/specimen-2, constrained recovery system was measured using this instrument. A stretched sample was fixed in the grip and liquid bath was filled with water at 70° C. and therefore was maintained at 70° C. The SMP film sample exerted a stress at 70° C. The load was sense through load self and then by dividing cross sectional area of test sample the recovery system was calculated as shown in Table-5.

TABLE 5

| Sl. No | % Strain | Recovery Stress (MPa) |
|---|---|---|
| 1 | 249 | 3.4153025 |
| 2 | 228 | 1.7078 |
| 3 | 207 | 1.31973125 |
| 4 | 186 | 1.00927625 |
| 5 | 165 | 0.776435 |
| 6 | 144 | 0.6212075 |
| 7 | 123 | 0.427173125 |
| 8 | 102 | 0.23313875 |
| 9 | 72 | 0 |

Results: The Table-5 shows 9 different typical recovery stress values obtained correspondingly to different % of strain. The recovery stress values are important for evaluating shape memory properties of material.

Example-6

Experiment

At fixed strain 249% and temperature varying and corresponding stress measurement of stretched sample/specimen 2. MWCNT sheet having induced strain was studied to observe the change in stresses will temperature from 30° C. to 70° C. The raise in temperature was controlled by temperature controller. The observations were recorded through the PC based data acquisition at an interval of 5° C. and corresponding stresses in terms of load were measured is shown in Table-6.

TABLE 6

| Sl. No | Temperature in (° C.) | Recovery Stress (MPa) |
|---|---|---|
| 1 | 30 | 0 |
| 2 | 35 | 0 |
| 3 | 40 | 0.9316625 |
| 4 | 45 | 1.7078 |
| 5 | 50 | 2.09586875 |
| 6 | 55 | 2.4839375 |
| 7 | 60 | 2.87200625 |
| 8 | 65 | 3.260075 |
| 9 | 70 | 3.4153025 |

Results: Result of change in recovery strains with temperature under constrained conditions is shown in Table-6 using this instrument.

Example-7

Experiment

The sample/specimen-3 of 2 phr MWCNT of dimension (mm) 5×10×0.1 mm was mounted in grips. Water was filled in the liquid bath to a level so that test specimen is completely immersed in water. Using temperature controller and heater, the temperature was increased to 70° C. with constant stirring to maintain uniformity in the liquid path. Test was conducted at fixed 70° C. temperature of the liquid. The sample was stretched at a constant rate and the corresponding stress in MPa is recorded through PC based data acquisition systems. The observation by the instrument is shown in Table-7 and evaluated by the instrument software. During stretching of sample at constant rate, the stress generated in the sample was obtained using the calibrated load cell. These values of load while divided by cross section of test specimen were considered as stress in MPa which is shown in Table-7.

TABLE 7

| Sl. No. | Wheel Rotation (rpm) | Sample length (mm) | Stress (MPa) |
|---|---|---|---|
| 1 | 0 | 5 | 0 |
| 2 | 2.1 | 7.1 | 0.587668919 |
| 3 | 4.2 | 9.2 | 0.923295946 |
| 4 | 6.3 | 11.3 | 1.258922973 |
| 5 | 8.4 | 13.4 | 1.59455 |
| 6 | 10.5 | 15.5 | 1.930177027 |
| 7 | 12.6 | 17.6 | 2.265804054 |
| 8 | 14.7 | 19.7 | 2.601431081 |
| 9 | 16.8 | 21.8 | 2.853151351 |
| 10 | 18.9 | 23.9 | 3.104871622 |
| 11 | 21 | 26 | 3.272685135 |
| 12 | 23.1 | 28.1 | 3.356591892 |
| 13 | 25.2 | 30.2 | 3.524405405 |

Results: System is working well. Temperature of liquid bath at 70° C. was attained with variation of ±1° C. System is capable of reporting correct stress and strain by the calibrated load cell and LVDT, which are mounted in the instrument.

Example-8

Experiment

At fixed temperature 70° C. recovery a stress measurement of stretched sample/specimen-3, constrained recovery system was measured using this instrument. A stretched sample was fixed in the grip and liquid bath was filled with water at 70° C. and therefore was maintained at 70° C. The SMP film sample exerted a stress at 70° C. The load was sense through load self and then by dividing cross sectional area of test sample the recovery system was calculated as shown in Table-8.

TABLE 8

| Sl. No | % Strain | Recovery Stress (MPa) |
|---|---|---|
| 1 | 250 | 3.272685135 |
| 2 | 229 | 2.014083784 |
| 3 | 208 | 1.510643243 |
| 4 | 187 | 1.175016216 |
| 5 | 166 | 0.923295946 |
| 6 | 145 | 0.671575676 |
| 7 | 124 | 0.503762162 |
| 8 | 103 | 0.335948649 |
| 9 | 82 | 0.168135135 |
| 10 | 70 | 0 |

Results: The Table-8 shows 10 different typical recovery stress values obtained correspondingly to different % of strain. The recovery stress values are important for evaluating shape memory properties of material.

Example-9

Experiment

At fixed strain 250% and temperature varying and corresponding a stress measurement of stretched sample/specimen 3. MVCNT sheet having induced strain was studied to observe the change in stresses will temperature from 30° C. to 70° C. The raise in temperature was controlled by temperature controller. The observations were recorded through the PC based data acquisition at an interval of 5° C. and corresponding stresses in terms of load were measured is shown in Table-9.

TABLE 9

| Sl. No | Temperature in (° C.) | Recovery Stress (MPa) |
|---|---|---|
| 1 | 30 | 0 |
| 2 | 35 | 0 |
| 3 | 40 | 0.587668919 |
| 4 | 45 | 1.007202703 |
| 5 | 50 | 1.426736486 |
| 6 | 55 | 1.84627027 |
| 7 | 60 | 2.685337838 |
| 8 | 65 | 3.104871622 |
| 9 | 70 | 3.272685135 |

Results: Result of change in recovery strains with temperature under constrained conditions is shown in Table-9 using this instrument.

Example-10

Experiment

The sample/specimen-4 of 3 phr MVCNT of dimension (mm) 5×10×0.1 mm was mounted in grips. Water was filled in the liquid bath to a level so that test specimen is completely immersed in water. Using temperature controller and heater, the temperature was increased to 70° C. with constant stirring to maintain uniformity in the liquid path. Test was conducted at fixed 70° C. temperature of the liquid. The sample was stretched at a constant rate and the corresponding stress in MPa is recorded through PC based data acquisition systems. The observation by the instrument is shown in Table-10 and evaluated by the instrument software. During stretching of sample at constant rate, the stress generated in the sample was obtained using the calibrated load cell. These values of load while divided by cross section of test specimen were considered as stress in MPa which is shown in Table-10.

TABLE 10

| Sl. No. | Wheel Rotation (rpm) | Sample length (mm) | Stress (MPa) |
|---|---|---|---|
| 1 | 0 | 5 | 0 |
| 2 | 2.1 | 7.1 | 0.810141304 |
| 3 | 4.2 | 9.2 | 1.147592391 |
| 4 | 6.3 | 11.3 | 1.485043478 |
| 5 | 8.4 | 13.4 | 1.755004348 |
| 6 | 10.5 | 15.5 | 2.092455435 |
| 7 | 12.6 | 17.6 | 2.429906522 |
| 8 | 14.7 | 19.7 | 2.699867391 |
| 9 | 16.8 | 21.8 | 2.969828261 |

TABLE 10-continued

| Sl. No. | Wheel Rotation (rpm) | Sample length (mm) | Stress (MPa) |
|---|---|---|---|
| 10 | 18.9 | 23.9 | 3.172298913 |
| 11 | 21 | 26 | 3.374769565 |
| 12 | 23.1 | 28.1 | 3.577240217 |
| 13 | 25.2 | 30.2 | 3.847201087 |

Results: System is working well. Temperature of liquid bath at 70° C. was attained with variation of ±1° C. System is capable of reporting correct stress and strain by the calibrated load cell and LVDT, which are mounted in the instrument.

Example-11

Experiment

At fixed temperature 70° C. recovery a stress measurement of stretched sample/specimen-4, constrained recovery system was measured using this instrument. A stretched sample was fixed in the grip and liquid bath was filled with water at 70° C. and therefore was maintained at 70° C. The SMP film sample exerted a stress at 70° C. The load was sense through load self and then by dividing cross sectional area of test sample the recovery system was calculated as shown in Table-11.

TABLE 11

| Sl. No | % Strain | Recovery Stress (MPa) |
|---|---|---|
| 1 | 250 | 3.50975 |
| 2 | 229 | 2.159945652 |
| 3 | 208 | 1.485043478 |
| 4 | 187 | 1.147592391 |
| 5 | 166 | 0.877631522 |
| 6 | 145 | 0.67516087 |
| 7 | 124 | 0.472690217 |
| 8 | 103 | 0.337709783 |
| 9 | 82 | 0.13523913 |
| 10 | 75 | 0 |

Results: The Table-11 shows 10 different typical recovery stress values obtained correspondingly to different % of strain. The recovery stress values are important for evaluating shape memory properties of material.

Example-12

Experiment

At fixed strain 250% and temperature varying and corresponding a stress measurement of stretched sample/specimen 4. MVCNT sheet having induced strain was studied to observe the change in stresses will temperature from 30° C. to 70° C. The raise in temperature was controlled by temperature controller. The observations were recorded through the PC based data acquisition at an interval of 5° C. and corresponding stresses in terms of load were measured is shown in Table-12.

TABLE 12

| Sl. No | Temperature in (° C.) | Recovery Stress (MPa) |
|---|---|---|
| 1 | 30 | 0 |
| 2 | 35 | 0 |
| 3 | 40 | 0.810141304 |
| 4 | 45 | 1.485043478 |
| 5 | 50 | 1.822494565 |
| 6 | 55 | 2.362416304 |
| 7 | 60 | 2.834847826 |
| 8 | 65 | 3.172298913 |
| 9 | 70 | 3.50975 |

Results: Result of change in recovery strains with temperature under constrained conditions is shown in Table-12 using this instrument.

Example-13

Experiment

The sample/specimen-5 of 5 phr MVCNT of dimension (mm) 5×10×0.1 mm was mounted in grips. Water was filled in the liquid bath to a level so that test specimen is completely immersed in water. Using temperature controller and heater, the temperature was increased to 70° C. with constant stirring to maintain uniformity in the liquid path. Test was conducted at fixed 70° C. temperature of the liquid. The sample was stretched at a constant rate and the corresponding stress in MPa is recorded through PC based data acquisition systems. The observation by the instrument is shown in Table-13 and evaluated by the instrument software. During stretching of sample at constant rate, the stress generated in the sample was obtained using the calibrated load cell. These values of load while divided by cross section of test specimen were considered as stress in MPa which is shown in Table-13.

TABLE 13

| Sl. No. | Wheel Rotation (rpm) | Sample length (mm) | Stress (MPa) |
|---|---|---|---|
| 1 | 0 | 5 | 0 |
| 2 | 2.1 | 7.1 | 0.945121739 |
| 3 | 4.2 | 9.2 | 1.350063043 |
| 4 | 6.3 | 11.3 | 1.68751413 |
| 5 | 8.4 | 13.4 | 2.024965217 |
| 6 | 10.5 | 15.5 | 2.362416304 |
| 7 | 12.6 | 17.6 | 2.699867391 |
| 8 | 14.7 | 19.7 | 2.969828261 |
| 9 | 16.8 | 21.8 | 3.307279348 |
| 10 | 18.9 | 23.9 | 3.577240217 |
| 11 | 21 | 26 | 3.847201087 |
| 12 | 23.1 | 28.1 | 4.117161957 |
| 13 | 25.2 | 30.2 | 4.387122826 |

Results: System is working well. Temperature of liquid bath at 70° C. was attained with variation of ±1° C. System is capable of reporting correct stress and strain by the calibrated load cell and LVDT, which are mounted in the instrument.

Example-14

Experiment

At fixed temperature 70° C. recovery a stress measurement of stretched sample/specimen-5, constrained recovery system was measured using this instrument. A stretched sample was fixed in the grip and liquid bath was filled with water at 70° C. and therefore was maintained at 70° C. The SMP film sample exerted a stress at 70° C. The load was sense through load self and then by dividing cross sectional area of test sample the recovery system was calculated as shown in Table-14.

TABLE 14

| Sl. No | % Strain | Recovery Stress (MPa) |
|---|---|---|
| 1 | 251 | 4.049671739 |
| 2 | 230 | 2.294926087 |
| 3 | 209 | 1.485043478 |
| 4 | 188 | 1.147592391 |
| 5 | 167 | 0.810141304 |
| 6 | 146 | 0.607670652 |
| 7 | 125 | 0.472690217 |
| 8 | 104 | 0.337709783 |
| 9 | 83 | 0.13523913 |
| 10 | 80 | 0 |

Results: The Table-14 shows 10 different typical recovery stress values obtained correspondingly to different % of strain. The recovery stress values are important for evaluating shape memory properties of material.

Example-15

Experiment

At fixed strain 251% and temperature varying and corresponding a stress measurement of stretched sample/specimen 5. MVCNT sheet having induced strain was studied to observe the change in stresses will temperature from 30° C. to 70° C. The raise in temperature was controlled by temperature controller. The observations were recorded through the PC based data acquisition at an interval of 5° C. and corresponding stresses in terms of load were measured is shown in Table-15.

TABLE 15

| Sl. No | Temperature in (° C.) | Recovery Stress (MPa) |
|---|---|---|
| 1 | 30 | 0 |
| 2 | 35 | 0.472690217 |
| 3 | 40 | 1.147592391 |
| 4 | 45 | 1.822494565 |
| 5 | 50 | 2.159945652 |
| 6 | 55 | 2.834847826 |
| 7 | 60 | 2.834847826 |
| 8 | 65 | 3.172298913 |
| 9 | 70 | 4.049671739 |

Results: Result of change in recovery strains with temperature under constrained conditions is shown in Table-15 using this instrument.

Non-Limiting Advantages of the Various Embodiments of the Invention

1. A unique and novel apparatus that can measure shape memory effects in liquids.
2. An efficient but inexpensive and simple arrangement under controlled temperature and in different liquids/environment conditions.
3. This invention provides an alternative to presently used systems having problems of delayed cooling and prolonged heating in environment chamber of a tensile testing machine that may cause deterioration and degradation of the material to be tested.

4. The tensile testing apparatus uses liquid bath as an alternative to having environment chamber which are not capable of testing the material under liquid environment or harsh fluid environment.

The invention claimed is:

1. An apparatus for testing shape memory effects, the apparatus comprising: a computer with data acquisition system (1) connected to a DC power supply (2), a signal processor (3), a load frame structure comprising a base plate structure (10), A supporting pillar (20) vertically above the base plate structure (10), a constant pitch screw (21) inside the supporting pillar (20), a crosshead (6) is connected to the screw (21) and a mounting pate (7) and mounted on the crosshead (6) and moving in a linear manner on the screw (21) via the supporting pillar (20), the screw (21) is attached to a servo motor (18) through a gear box (19), a first end of a measurement device load cell (13) attached to the mounting plate (7) and a second end attached to a movable grip (14), wherein the load cell (13) is connected to the signal processor (3), a linear variable displacement transducer (LVDT) (22) configured for displacement measurement and being mounted on the crosshead (6) and measurements are recorded in the computer (1) through signal processor (3), a specimen (15) is held between the movable grip (14) and a stationary grip (16) with gripping screws (17), a heating system comprises a heating controller (4) connected to the computer (1), a heating coil (12) and a temperature sensor (11) connected to the heating controller (4), a liquid-bath (8) is arranged on the base plate (10), the liquid-bath comprising an inlet and outlet (9) and a stirring arrangement (23) configured for stirring of a liquid medium of the liquid bath, wherein the liquid bath is within a single chamber enclosing at least the heating coil (12), the temperature sensor (11), the stirring arrangement (23), the movable grip (14), the stationary grip (16), and the specimen (15).

2. The apparatus as claimed in claim 1, wherein the temperature sensor (11), the heating coil (12), the movable grip (14), the specimen (15), the stationary grip (16), the gripping screws (17), and the stirring arrangement (23) are submerged in the liquid medium.

3. The apparatus as claimed in claim 1, wherein the apparatus is configured for measurement of shape memory effect of samples of polyurethane and composite samples nanotubes (MWCNT) reinforced shape-memory-thermoplastic-polyurethane (SMTPU) using thermo-mechanical cycles.

4. The apparatus as claimed in claim 1, wherein:
the liquid bath is an open or closed chamber configured for providing controlled heating and stirring characteristics for the liquid medium, and
the liquid medium is a transparent and non-reactive material.

5. The apparatus as claimed in claim 4, wherein the liquid is water.

6. An apparatus as claimed in claim 1, wherein the liquid bath is configured as a liquid circulation system that maintains a temperature of the liquid medium within a range of 30° C. to 70° C.

7. The apparatus as claimed in claim 1, wherein the liquid medium is at least one of a harsh liquid medium, a basic liquid medium, or a neutral liquid medium.

8. The apparatus as claimed in claim 7, wherein the harsh liquid medium is selected from the group consisting of: a hot liquid medium, a cold liquid medium, a corrosive liquid medium, a non-corrosive liquid medium, a chemically reactive liquid medium or an acidic liquid medium.

9. The apparatus as claimed in claim 1, wherein the computer with the data acquisition system is configured for measurement of shape memory effects through a plurality of measurable parameters.

10. The apparatus as claimed in claim 9, wherein the shape memory effects include one or more of: shape recovery, shape fixity, shape recovery stress, or shape recovery strain.

11. The apparatus as claimed in claim 9, wherein the plurality of measurable parameters include one or more of: a wheel revaluation ranging from 0 to 25.2, a sample length ranging from 5 to 30.2 mm, stress ranging from 0 to 4.38 MPa, a percentage strain ranging from 70 to 251, a recovery stress ranging from 0 to 4.04 MPa, or a temperature maintained at 70±1° C.

12. The apparatus as claimed in claim 1, wherein the apparatus is configured for measurement of two or more specimens of at least one of different size or shape.

13. The apparatus as claimed in claim 12, wherein the two or more specimens are selected from the group consisting of: films, rods, filaments, or bars.

14. The apparatus as claimed in claim 1, wherein:
the liquid medium is a transparent liquid medium, and
the apparatus is configured for a visual measurement under the transparent liquid medium.

* * * * *